(12) United States Patent
Wang (10) Patent No.: US 11,979,693 B2
(45) Date of Patent: May 7, 2024

(54) RESOURCE MANAGEMENT METHOD AND APPARATUS, COMMUNICATION DEVICE, AND STORAGE MEDIUM

(71) Applicant: ZTE CORPORATION, Guangdong (CN)

(72) Inventor: Qilei Wang, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 129 days.

(21) Appl. No.: 17/620,684

(22) PCT Filed: Jun. 16, 2020

(86) PCT No.: PCT/CN2020/092295
§ 371 (c)(1),
(2) Date: Dec. 18, 2021

(87) PCT Pub. No.: WO2020/253478
PCT Pub. Date: Dec. 24, 2020

(65) Prior Publication Data
US 2022/0103916 A1   Mar. 31, 2022

(30) Foreign Application Priority Data
Jun. 19, 2019 (CN) .......................... 201910533067.4

(51) Int. Cl.
*H04Q 11/00* (2006.01)
*H04B 10/278* (2013.01)
*H04J 14/02* (2006.01)

(52) U.S. Cl.
CPC ....... *H04Q 11/0067* (2013.01); *H04B 10/278* (2013.01); *H04J 14/02* (2013.01); *H04Q 2011/0079* (2013.01); *H04Q 2011/0086* (2013.01)

(58) Field of Classification Search
CPC .................................................. H04Q 11/0071
See application file for complete search history.

(56) References Cited

U.S. PATENT DOCUMENTS

| | | | |
|---|---|---|---|
| 2011/0090785 A1* | 4/2011 | Shimizu | H04L 47/728 370/389 |
| 2016/0112276 A1* | 4/2016 | Nagarajan | H04L 67/10 715/736 |
| 2019/0357084 A1* | 11/2019 | Chou | H04L 41/0806 |
| 2020/0220773 A1* | 7/2020 | Terashima | H04L 43/0817 |
| 2022/0086545 A1* | 3/2022 | Sun | H04Q 11/0062 |

* cited by examiner

*Primary Examiner* — Shi K Li
(74) *Attorney, Agent, or Firm* — Li & Cai Intellectual Property (USA) Office (57) ABSTRACT

The present disclosure provides a resource management method, a communication device, and a storage medium. The resource management method includes: obtaining node identification information and interface information of an optical network node; establishing a node resource model according to the node identification information and the interface information; and storying the node resource model in a resource library.

15 Claims, 5 Drawing Sheets

| Type of transitional link object | Length of transitional link object |
|---|---|
| Identification information of an input interface on the transitional link ||
| Capability information of an input interface on the transitional link ||
| Identification information of an output interface on the transitional link ||
| Capability information of an output interface on the transitional link ||

RESOURCE MANAGEMENT METHOD AND APPARATUS, COMMUNICATION DEVICE, AND STORAGE MEDIUM

The present application is a National Stage of International Application No. PCT/CN2020/092295, filed on Jun. 16, 2020, which claims priority to Chinese Patent Application No. 201910533067.4 filed on Jun. 19, 2019, in Chinese Patent Office, both of which are incorporated by reference herein in their entireties.

TECHNICAL FIELD

The present disclosure relates to, but is not limited to, the field of communication technology.

BACKGROUND

In order to better complete communications between a plurality of manufacturers or extend a transmission distance of an optical network, optical components such as transponders, muxponders and regenerators are widely used as optical network nodes. Especially in an OTN (Optical Transport Network) and an Ethernet transmission network, there are a large number of application scenarios of the transponders, the muxponders and the regenerators, and in different application scenarios, according to specific application requirements, there are different requirements for the transponders, the muxponders and the regenerators. At present, with respect to the optical components such as the transponders, the muxponders and the regenerators, there is no specific resource management library for managing resource information of the transponders, the muxponders and the regenerators. Therefore, in a current networking process, when configuring resources for the optical components such as the transponders, the muxponders and the regenerators in a network path, it is often necessary to obtain capability information of the transponders, the muxponders and the regenerators according to descriptions of the transponders, the muxponders and the regenerators, and then select corresponding capacity information of the transponders, the muxponders and the regenerators according to a current networking requirement to performing the configuration, which is inefficient. Especially with the enhancement of capabilities of the optical components such as the transponders, the muxponders and the regenerators and the diversification of network requirements, it is more difficult for this inefficient configuration to satisfy the requirements, and to guarantee accuracy of the configuration.

SUMMARY

According to one aspect of an embodiment of the present disclosure, provided is a resource management method, including: obtaining node identification information and interface information of an optical network node; where the optical network node includes at least one input interface and at least one output interface; and the interface information includes interface identification information and interface capability information of any one of the at least one input interface and the at least one output interface, and a connection relationship between the at least one input interface and the at least one output interface; establishing a node resource model according to the node identification information and the interface information; where model identification information of the node resource model uniquely corresponds to the node identification information, the resource model includes at least one transitional link, and link information of any one of the at least one transitional link includes: interface identification information and interface capability information of an input interface and an output interface that have a connection relationship and are included respectively in an input end and an output end of the transitional link; and storing the node resource model in a resource library.

According to another aspect of the embodiment of the present disclosure, provided is a resource management apparatus, including: an information acquisition module, configured to obtain node identification information and interface information of an optical network node; where the optical network node includes at least one input interface and at least one output interface; and the interface information includes interface identification information and interface capability information of any one of the at least one input interface and the at least one output interface, and a connection relationship between the at least one input interface and the at least one output interface; a model establishment module, configured to establish a node resource model according to the node identification information and the interface information; where model identification information of the node resource model uniquely corresponds to the node identification information, the resource model includes at least one transitional link, and link information of any one of the at least one transitional link includes: interface identification information and interface capability information of an input interface and an output interface that have a connection relationship and are included respectively in an input end and an output end of the transitional link; and a storage control module, configured to store the node resource model in a resource library.

According to yet another aspect of the embodiment of the present disclosure, provided is a communication device, including a processor and a memory, where the memory stores a computer program; and the processor is configured to execute the computer program to implement the steps of the resource management method provided by the embodiment of the present disclosure.

According to yet another aspect of the embodiment of the present disclosure, provided is a computer-readable storage medium having a computer program stored thereon, where the computer program is capable of being executed by one or more processors to implement the steps of the resource management method provided by the embodiment of the present disclosure.

DETAILED DESCRIPTION

The specific embodiment of the present disclosure will be further described in detail below with reference to the drawings, to make purposes, technical schemes and advantages of the present disclosure clearer. It should be understood that the specific embodiment described herein is only used to explain the present disclosure, and is not intended to limit the present disclosure.

Figure 1:
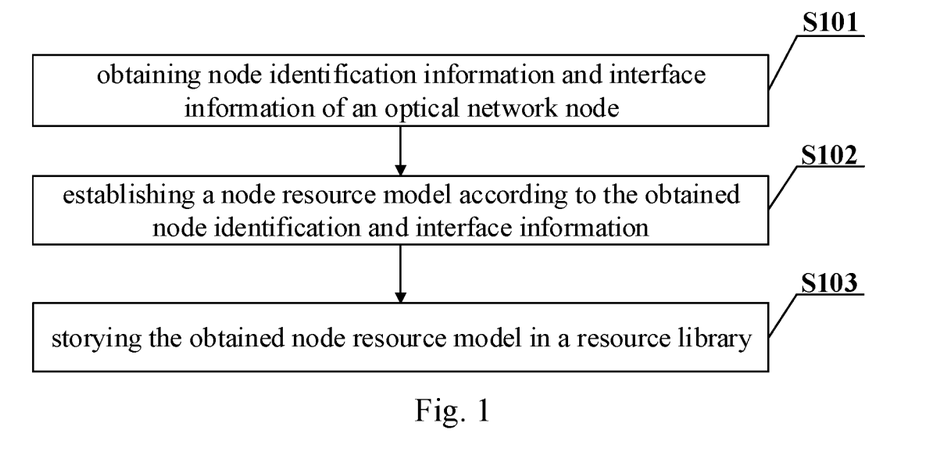
FIG. 1 is a flowchart of a resource management method provided by the embodiment of the present disclosure.

In order to better complete communications or extend a transmission distance of an optical network, optical components such as converters/regenerators are widely used as optical network nodes in an OTN and an Ethernet transmission network. At present, there is no specific resource management library for managing resource information with respect to the optical nodes such as the converters/regenerators. As a result, in a networking process, configuration for these optical network nodes is inefficient and it is difficult to guarantee accuracy of the configuration. Therefore, the embodiment of the present disclosure provides a resource management method. As shown in FIG. 1, it is a flowchart of a resource management method according to the embodiment of the present disclosure, and the method includes steps S101-S103.

In step S101, node identification information and interface information of an optical network node is obtained.

According to the embodiment provided by the present disclosure, the optical network node may include, but is not limited to, various optical devices that perform a conversion between an optical signal and an electrical signal; for example, it may include, but is not limited to, at least one of a converter and a regenerator. The converter may be classified into a transponder and a muxponder, according to whether multiplexing is supported.

According to the embodiment provided by the present disclosure, the interface information may include interface identification information and interface capability information of respective interfaces (including an input interface and an output interface) of the optical network node, and a connection relationship between the input and output interfaces. The interface identification information may be various information that is able to uniquely identify the interface, and include, but is not limited to, an interface number.

The node identification information of the optical network node in the embodiment provided by the present disclosure may include, but is not limited to, various identification information that is able to uniquely identify the optical network node.

For ease of understanding, functions of the regenerator, the transponder and the muxponder are illustrated by examples below.

The regenerator may also be considered as a simplified version of the transponder, which can only be used to complete a function of converting an input optical signal into an electrical signal, and then converting the electrical signal into optical signals with different frequencies, thus extending a transmission distance of the optical signal. In some application scenarios, the regenerator may not detect any signals in an electrical signal layer. In addition, a new medium structure frequency mixer defined by ITU-TG. 807 is actually a regenerator, which modulates an analog optical signal to optical signals with different center frequencies for transmission.

Figure 2:
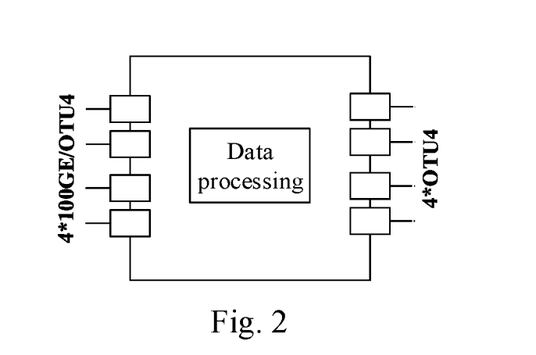
FIG. 2 is a schematic diagram of a structure of a transponder provided by the embodiment of the present disclosure.

The transponder is able to terminate a signal, and simply detects header overhead. A structure of an exemplary transponder is shown in FIG. 2. The transponder can terminate electrical signal layer signals on ports at both ends, and perform some detection on the header overhead of the electrical signal layer signals; and if there is a fault, the fault can also be reported accordingly. In some exemplary examples, the transponder may support simple multiplexing functions, such as mapping a 100 GE signal into an ODU4 signal and then performing modulating for optical layer signals.

The muxponder can be understood as a transponder with complex functions (e.g., a sliceable bandwidth variable transponder). The muxponder can perform slicing operations on an electrical signal layer data stream according to requirements, such as slicing a single OTUCn (Completely Standardized Optical Transport Unit-Cn, which has a nominal rate of N*100 G and supports 5G timeslot granularity) data stream of 400 G into four OTUC data streams of 100 G, and data encapsulation is further performed and the encapsulated data is transmitted on a corresponding physical optical port. The muxponder may further have a specific data processing function. For example, when an OTUCn signal is processed by a transponder, a part of available slots need to be discarded before the OTUCn signal can be transmitted on an OTUCn-M of a partial rate (in some scenarios, a rate of the OTUCn signal may not be an integer multiple of 100 G due to constraints of an actual physical path, and this signal is often referred to as OTUCn-M or the partial rate). In this case, the OTUCn signal may be treated as a fixed data stream, and some specific bits of data of the OTUCn signal may be discarded according to configuration. In order to facilitate understanding, the muxponder is illustrated by taking a 400 G transmission scenario as an example with reference to two different muxponders that can be used in an OTN internal conversion scenario as shown in FIG. 3 and FIG. 4.

Figure 3:
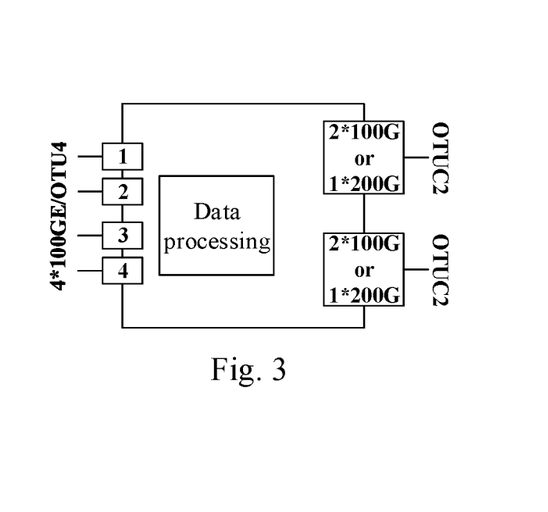
FIG. 3 is a schematic diagram of a structure of a muxponder provided by the embodiment of the present disclosure.

FIG. 3 is a schematic diagram of a structure of a muxponder provided by the embodiment of the present disclosure. The muxponder in this scenario maps four 100 GE/OTU4 signals with different wavelengths or a same wavelength into two OTUC2 signals through optical-electric conversion and data processing; and then, after electro-optical conversion, two different ports are used to transmit the two OTUC2 signals of 200 G. The OTUC2 signal on each port may be transmitted through one optical signal of 200 G or two optical signals of 100 G.

Figure 4:
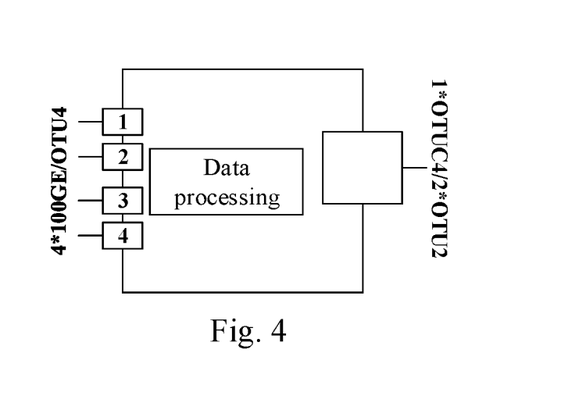
FIG. 4 is another schematic diagram of a structure of a muxponder provided by the embodiment of the present disclosure.

FIG. 4 is another schematic diagram of a structure of a muxponder provided by the embodiment of the present disclosure. The muxponder in this scenario encapsulates and maps four (or two) 100 GE/OTU4 signals with different wavelengths or a same wavelength into one OTUC4 signal through optical-electric conversion and data processing; and then, after electro-optical conversion, a single 400 G optical signal or four 100 G optical signals with different frequencies are used to transmit the OTUC4 signal of 400 G. It can also be classified according to configuration. Every two 100 GE/OTU4 input signals are encapsulated as a group and mapped to an OTUC2 signal of 200 G, and each OTUC2 signal of 200 G is transmitted on one 200 G optical signal or two 100 G optical signals with different frequencies, and the two OTUC2 optical layer signals of 200 G may be transmitted from one port via wavelength division multiplexing (WDM).

For the above two scenarios, an internal processing structure of the muxponder may further support discarding of unavailable slots, as required.

It is found through researching that an internal structure of the optical network node such as the transponder, the muxponder or the regenerator generally does not have a complex switching capability, and a connection relationship between the input interface and the output interface of the optical network node is basically unchanged. Therefore, for the transponder, the muxponder and the regenerator mentioned above, a connection condition between the input interface and the output interface may be inferred according to information such as modulation format of each interface of the transponder, the muxponder and the regenerator in the optical signal layer. Optical modules of the transponder, the muxponder and the regenerator may be used for completing corresponding optical-electric conversion or electric-optical conversion. Internal data processing modules are able to support processing of Ethernet and OTU electrical signals, including OTU electrical signal layer signal fault detection, and unavailable slot discarding processing and other functions.

In step S102, a node resource model is established according to the node identification information and the interface information.

According to the embodiment provided by the present disclosure, model identification information of the node resource model may be set to uniquely correspond to the node identification information. The model identification information of the node resource model may be directly set as the node identification information of the optical network node, or set as other information uniquely corresponding to the node identification information of the optical network node, as long as the node resource model corresponding to the optical network node can be uniquely found according to the node identification information of the optical network node.

According to the embodiment provided by the present disclosure, the established resource model may include at least one transitional link, and the transitional link can be flexibly established according to the connection relationship between the input and output interfaces of the optical network node. An input end and an output end of the transitional link may include interface identification information and interface capability information of the input interface and the output interface that have the connection relationship. The interface identification information and the interface capability information of the input interface and the output interface that have the connection relationship that are included respectively in the input end and the output end of the transitional link may be used as link information of the transitional link. In this way, the transitional link of the internal structure of the optical network node can be reflected according to the resource model corresponding to the optical network node, and an internal data processing capability of the optical network node such as the converter/regenerator can be inferred from the link information of the transitional link.

In step S103, the node resource model is stored in a resource library.

According to the embodiment provided by the present disclosure, in the future, the node resource model needs to be queried and used, the node resource model can be queried from the resource library based on the identification information of the optical network node, and in addition, an appropriate capability may be selected to complete resource configuration based on a communication requirement.

In some application scenarios of the embodiment provided by the present disclosure, the obtained interface capability information may include capability information at the optical signal layer of an interface.

According to the embodiment provided by the present disclosure, the established transitional link may include an optical signal layer transitional link, and the link information of the transitional link may include optical signal layer transitional link information. The optical signal layer transitional link information may include: interface identification information and capability information at the optical signal layer of an input interface and an output interface that have a connection relationship and are included respectively in an input end and an output end of the optical signal layer transitional link.

In an exemplary example, the capability information at the optical signal layer of the interface may include, but is not limited to: a spectrum range supported by the interface, a modulation format supported by the interface, and/or an error correction code format (which may include, but is not limited to a Forward Error Correction code (FEC) for example) supported by the interface.

In an exemplary example, when the optical network node includes the converter (which may include the transponder and the muxponder), the interface capability information of each input interface and output interface of the converter may further include: capability information at the electrical signal layer of the interface.

According to the embodiment provided by the present disclosure, the transitional link established for the converter may also include an electrical signal layer transitional link, and the link information of the transitional link may include electrical signal layer transitional link information. The electrical signal layer transitional link information may include: interface identification information and capability information at the electrical signal layer of an input interface and an output interface that have a connection relationship and are included respectively in an input end and an output end of the electrical signal layer transitional link. In an exemplary example, the capability information at the electrical signal layer of the interface may include a signal type supported by the interface. Of course, the capability information at the electrical signal layer of the interface may include other information that can reflect a capability of the interface at the electrical signal layer.

Figure 5:
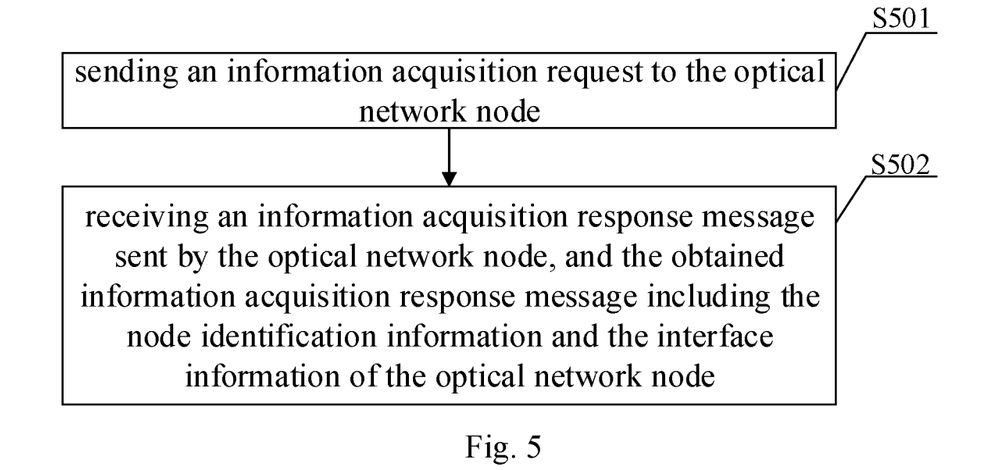
FIG. 5 is a flowchart of an obtaining method of node identification information and interface information provided by the embodiment of the present disclosure.

According to the embodiment provided by the present disclosure, the node identification information and the interface information of the optical network node may be obtained according to information such as a design description or a function description of the optical network node; or a request may be directly sent to the optical network node to obtain the node identification information and the interface information of the optical network node. As shown in FIG. 5, it is a flowchart of an obtaining method of the node identification information and the interface information provided by the embodiment of the present disclosure. Obtaining the node identification information and the interface information of the optical network node may include step S501 and step S502.

In step S501, an information acquisition request is sent to the optical network node. In this step, an network management device or a header node in a network path may send the information acquisition request to the optical network node.

In step S502, an information acquisition response message sent by the optical network node is received, and the information acquisition response message includes the node identification information and the interface information of the optical network node.

In some application scenarios, the muxponder may be used in a flexible rate optical digital unit (ODUflex) scenario. At this time, after receiving the information acquisition request by the muxponder, not only the interface capability information of its own input interface and output interface is extracted and sent to a requester, but also ODUflex information is carried. The ODUflex information may include, but is not limited to, at least one of ODUflex bandwidth information and ODUflex occupied slot information. In the present scenario, the link information of the electrical signal layer transitional link established for the muxponder further includes the ODUflex information. For example, in an exemplary example, the ODUflex information may include ODUflex identity information, the ODUflex bandwidth information, and/or the ODUflex occupied slot information.

According to the resource management method provided by the embodiment of the present disclosure, the node resource model can be established for the optical network node such as the transponder, the muxponder or the regenerator, and the resource model is able to represent an internal capability of the transponder, the muxponder or the regenerator. At the same time, the resource model may also be used for configuring the transponder, the muxponder or the regenerator.

To facilitate understanding, the following illustrates the resource management method provided by the embodiment of the present disclosure, by taking an application scenario of the transponder, the muxponder and the regenerator in a latest OTN network as an example.

Figure 6:
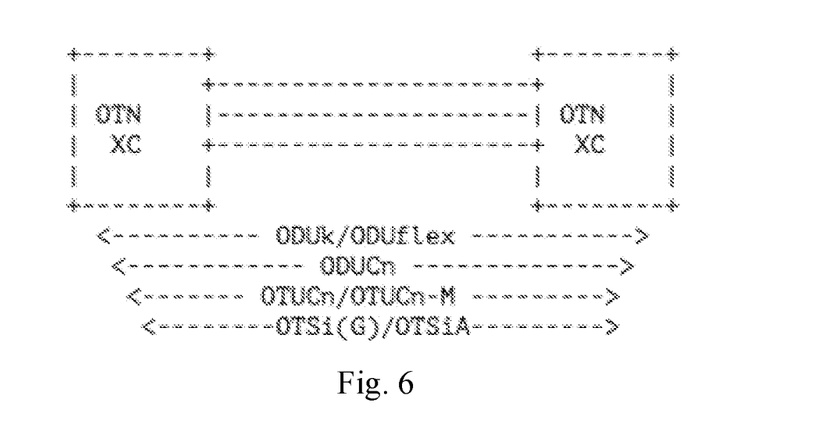
FIG. 6 is a schematic diagram of an application scenario of a partial rate provided by the embodiment of the present disclosure.
Figure 7:
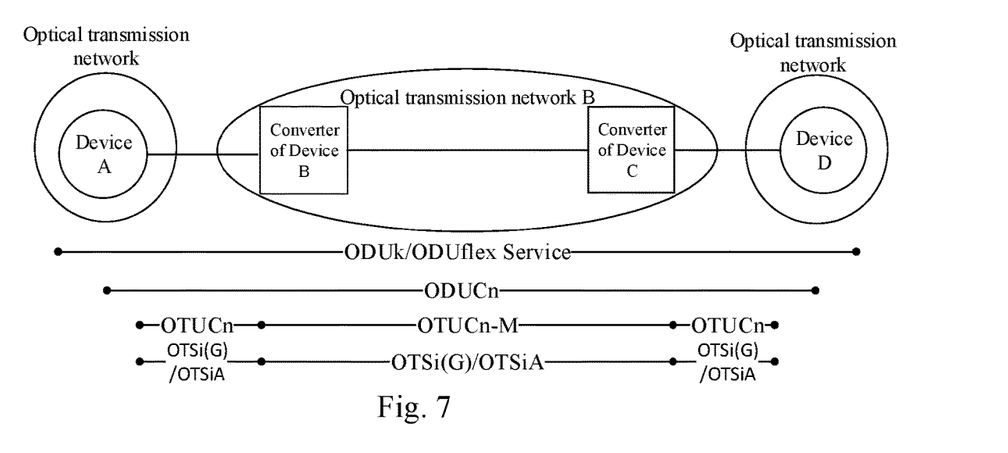
FIG. 7 is another schematic diagram of an application scenario of a partial rate provided by the embodiment of the present disclosure.

In the present exemplary example, ITU-T SG15 is mainly responsible for development of standards relating to OTN over 100 G. The latest version of the G.709 optical transmission network has undergone a major revision in recent years. A higher rate OTU signal, also known as OTUCn, which has a nominal rate of N×100 G and supports 5G timeslot granularity, is introduced into the latest version of G.709, 2016. In some scenarios, the rate of the OTUCn signal may not be an integer multiple of 100 G due to constraints of an actual physical path, and this signal is often referred to as OTUCn-M or partial rate. Allocation of OTUCn-M slots can be determined by an operator or a specific application. In some scenarios, unavailable slots may also be placed in last slot positions of the OTUCn to reduce complexity. Two classical partial rate application scenarios are given in an appendix of G.709, as shown in FIGS. 6 and 7, which are two schematic diagrams of partial rate application scenarios provided by the embodiment of the present disclosure. In FIG. 6, the partial rate scenario is directly deployed between two adjacent devices. OTUCn/OTUCn-M and ODUCn (Optical Data Unit-Cn) which have a same span. In this scenario, converters/muxponders are commonly used, which can be used to complete multiplexing of multiple 100 G Ethernet signals or multiple ODUk (Optical Data Unit-k) signals to a large ODUCn signal, and support an ability of a reverse and demultiplexing process. Alternatively, in a simplest case, there is no signal multiplexing involved, only parallel conversion from ODUk signals to ODUk signals is involved, which aims at transmitting on a different medium which is usually a optical signal (OTSi). Typically, these converters/muxponders are integrated in an OTN XC at both ends. In FIG. 7, ODUCn and OTUCn/OTUCn-M have different spans, and an end-to-end ODUCn is carried by three different OTUCn/OTUCn-M spans. In this scenario, the device B and the device C may perform some conversion functions, that is, OTU data level does not change, but is transmitted on different optical layer media. In some cases, OTUCn-M, i.e., the discarding of the unavailable slots, will be involved.

Figure 8:
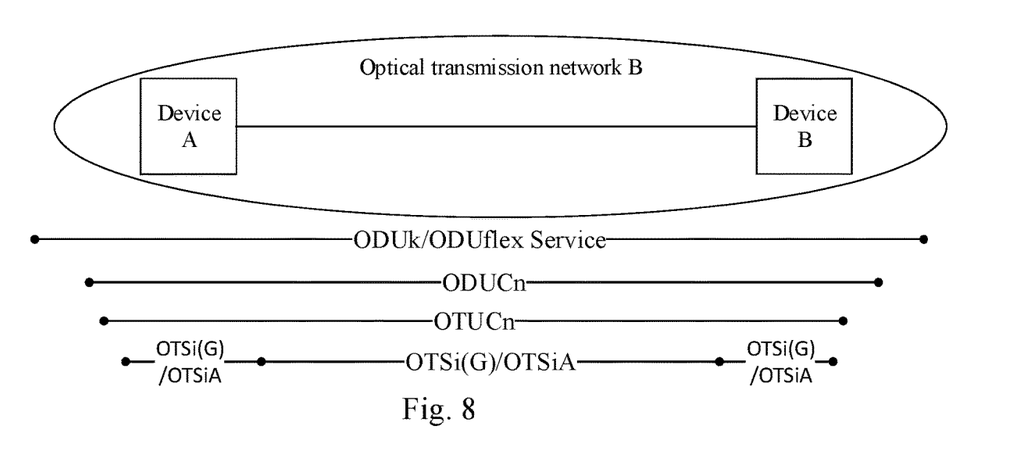
FIG. 8 is a schematic diagram of a scenario of a single carrier provided by the embodiment of the present disclosure.

FIG. 8 shows a schematic diagram of a scenario of a single carrier deployed based on an existing network. In this scenario, a regenerator may be used to complete wavelength conversion. This regenerator may be regarded as a simplified transponder, which can extend a distance of optical transmission, and then modulate the optical signal to optical signals with different properties for transmission, without detecting the overhead of the electrical layer signal, such as the header overhead of the OUT.

According to the embodiment provided by the present disclosure, for the optical network node such as the transponder, the muxponder or the regenerator in the application scenario in the above example (but not limited to the scenario in the above example), the transitional link (also called inter-layer Link in some scenarios) is used to model internals of the transponder, muxponder and regenerator, which may include obtaining capabilities of interfaces at both ends of the transitional link (i.e., connection relationships and capability information of input interfaces and output interfaces of the transponder, muxponder and regenerator), and inferring internal data processing capabilities of the converter/regenerator, according to the capabilities of the interfaces at the both ends of the link. For example, a connection type of the transitional link is included, which indicates that whether it is a point-to-point link, a point-to-multipoint link, a multipoint-to-point link, or a multipoint-to-multipoint link. Spectrum ranges, modulation formats, and FEC formats supported by input and output ports in the optical signal layer, and signal types supported by the input and output ports in the electrical signal layer, etc. are included. Through these pieces of information, it can be determined whether the transponder, muxponder and regenerator support adaptive encapsulation processing between signals of different layers/transmission technologies, and discarding processing of the unavailable slots, etc. The network nodes may flood this data to help a path computing unit calculate end-to-end connections, to indicate the node information of the intermediate transponder, muxponder and regenerator passed through, and configuration information of respective nodes.

According to the embodiment provided by the present disclosure, the signal conversion of the transponder, muxponder and regenerator may be configured, through configuring internal transitional links of the transponder, muxponder and regenerator, which specifically includes configuring information such as the spectrum ranges, modulation formats, and FEC formats to be used in the optical signal layers at both ends of the transitional link, and information of the signal type to be supported in the electrical signal layer. Based on these configurations, data conversion processing that needs to be done inside the transponder, muxponder and regenerator is deduced by the transponder, muxponder and regenerator, and a corresponding data processing configuration, which may specifically include data encapsulation (for example, encapsulating an Ethernet signal into an OTN signal) and discarding of the unavailable slots, is completed. In this way, when publishing attributes of the transitional links, the internal processing capabilities of the transponder, muxponder and regenerator are also published. The transitional links may be point-to-point, multipoint-to-point, point-to-multipoint, or multipoint-to-multipoint. Both ends of each transitional link usually support a variety of different switching technologies and capabilities. For ease of understanding, several examples of establishing node resource models are illustrated below.

Example 1: Node Resource Model Establishing for Regenerator

Based on the previous description, it can be seen that the regenerator may only convert the optical layer signal at the input interface into optical layer signals with different frequencies at the output interface. Therefore, in this example, only a corresponding transitional link in the optical signal layer may be established for the regenerator, i.e., an optical signal layer transitional link.

In this example, the optical layer conversion capability inside the regenerator may be supported and configured specifically, through modeling the internal of the regenerator as the optical signal layer transitional link, and representing different capabilities of the optical signal layers at the input end and output end of the optical signal layer transitional link. When establishing a connection, it can be configured based on the optical signal layer transitional link, to provide an end-to-end connection service. The following method may be used to model the capability information and attributes of the optical signal layer at the input and output ends of the optical signal layer transitional link. For one regenerator, there is generally a point-to-point link. It is assumed that an input interface number of the regenerator is represented by N, and an output interface number is represented by M. The input end and output end of the transitional link in the optical signal layer can support optical signals with different attributes. The node resource model can be established as follows: an optical signal layer transitional link 1, including an identifier of the input interface N, a spectrum range supported by the input interface N, a modulation format supported by the input interface N, and a FEC format supported by the input interface N; and an identifier of the output interface M, a spectrum range supported by the output interface M, a modulation format supported by the output interface M, and a FEC format supported by the output interface M.

Example 2: Node Resource Model Establishing for Muxponder

As shown in FIG. 2, the transponder may be considered as a simple point-to-point internal transitional link, so it will not be described here. As for the muxponder, the following example is illustrated by the establishment of the node resource model of the muxponder as shown in FIG. 3.

Figure 9:
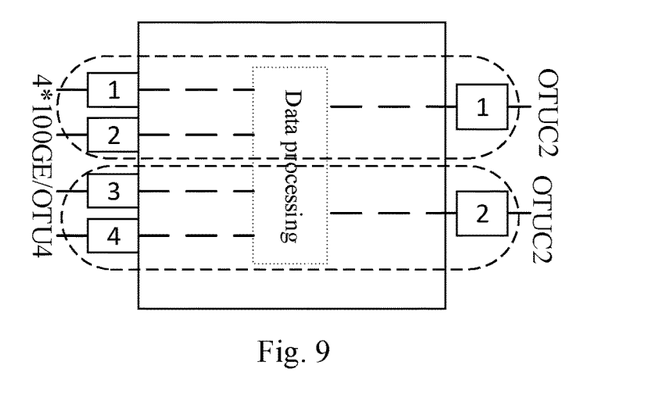
FIG. 9 is a schematic diagram of transitional links of a muxponder provided by the embodiment of the present disclosure.

In the present example, two multipoint-to-point transitional links may be established for the muxponder. FIG. 9 is a schematic diagram of the transitional links of the muxponder provided by the embodiment of the present disclosure. A node resource model of the muxponder may include an optical signal layer transitional link 2 and an electrical signal layer transitional link 1.

The optical signal layer transitional link 2 includes: an identifier of an input interface 1, a spectrum range supported by the input interface 1, a modulation format supported by the input interface 1, a FEC format supported by the input interface 1 . . . an identifier of an input interface 2, a spectrum range supported by the input interface 2, a modulation format supported by the input interface 2, and a FEC format supported by the input interface 2; and an identifier of an output interface 1, a spectrum range supported by the output interface 1, a modulation format supported by the output interface 1, and a FEC format supported by the output interface 1.

The optical signal layer transitional link 2 further includes: an identifier of an input interface 3, a spectrum range supported by the input interface 3, a modulation format supported by the input interface 3, a FEC format supported by the input interface 3 . . . an identifier of an input interface 4, a spectrum range supported by the input interface 4, a modulation format supported by the input interface 4, and a FEC format supported by the input interface 4; and an identifier of an output interface 2, a spectrum range supported by the output interface 2, a modulation format supported by the output interface 2, and a FEC format supported by the output interface 2.

The electrical signal layer transitional link 1 includes: the identifier of the input interface 1, a signal type supported by the input interface 1 (OTU4 & 100 GE) . . . the identifier of the input interface 2, and a signal type supported by the input interface 2 (OTU4 & 100 GE); and the identifier of the output interface 1, and a signal type of OTUC2/OTUC2-M supported by the output interface 1.

The electrical signal layer transitional link 1 further includes: the identifier of the input interface 3, a signal type supported by the input interface 3 (OTU4 & 100 GE) . . . the identifier of the input interface 4, and a signal type supported by the input interface 4 (OTU4 & 100 GE); and the identifier of the output interface 2, and a signal type of OTUC2/OTUC2-M supported by the output interface 2.

According to the modulation format information of the input and output interfaces at the optical layer carried by the above transitional links, and the information of the signal supported by the electrical layer, the internal data processing capability of the muxponder can be inferred. For example, based on the connection relationships between the input interfaces and the output interfaces, it can be inferred that whether the transitional link is a point-to-point connection or a point-to-multipoint connection. For another example, according to the modulation format type supported by each interface, data bandwidth information of each interface may be obtained; and according to the data bandwidth information of each interface combined with the connection relationships between the input and output interfaces, a data splitting mode supported by the transitional link may be inferred, e.g., two 100 G signals may be transmitted in one OTUC2 of 200 G. For another example, it may be determined whether the transitional link supports the type of encapsulation mapping supported between the input and output interfaces, e.g., whether it supports encapsulation of 100 GE into ODU signal, according to the data signal types supported by the input and output interfaces; and it may be determined whether the transitional link supports the discarding of the unavailable slots, according to whether the output interface supports the OTUCn-M signal type of the electrical signal layer.

According to the embodiment provided by the present disclosure, based on the node capability information disclosed above, devices may be configured by using tools such as a network management and a header node on the communication link. Based on path calculation results, the configuration of the transitional link and the establishment of the end-to-end connection can be completed According to the embodiment provided by the present disclosure, for the ODUflex scenario, an internal configuration mapping of a node may be expressed through multiple hierarchical signal types in the present embodiment. For example, the electrical signal layer transitional link includes the identifier of the input interface 3, the signal type supported by the input interface 3 (OTU4 & 100 GE) . . . the identifier of the input interface 4, and the signal type supported by the input interface 4 (OTU4&100 GE); ODUflex identity information, ODUflex bandwidth and occupied slot information; and the identifier of the output interface 2, and the signal type of OTUC2/OTUC2-M supported by the output interface 2.

Figure 10:
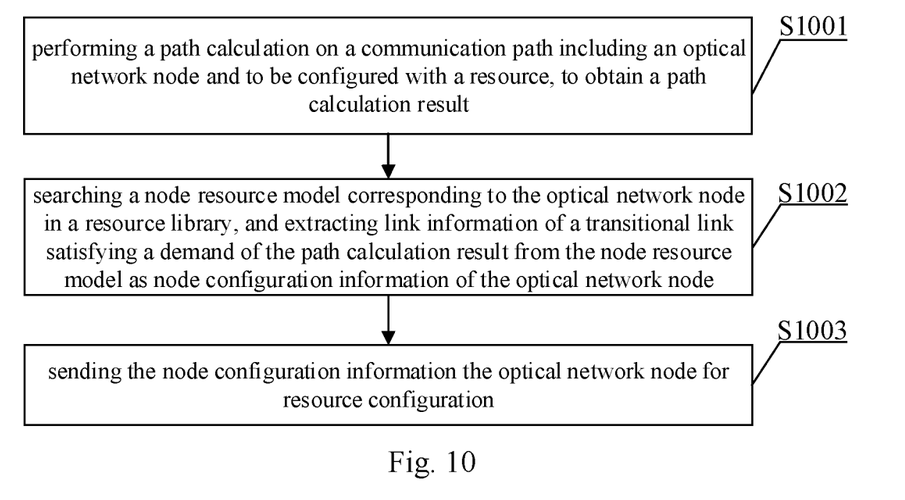
FIG. 10 is a flowchart of a resource configuration method provided by the embodiment of the present disclosure.

According to the embodiment provided by the present disclosure, on the basis of the above resource management method, a resource configuration method is further provided, that is, the resource management method may further include the steps of configuring a resource for the network node. As shown in FIG. 10, it is a flowchart of the resource configuration method provided by the embodiment of the present disclosure. The configuration method may include steps S1001 to S1003.

In step S1001, a path calculation is performed on a communication path including an optical network node and to be configured with a resource, to obtain a path calculation result. The path calculation may be implemented in various ways capable of implementing path requirements, which will not be described here.

In step S1002, a node resource model corresponding to the optical network node is found in a resource library, and link information of a transitional link satisfying a demand of the path calculation result is extracted from the node resource model as node configuration information of the optical network node.

In step S1003, the node configuration information is sent to the optical network node for resource configuration.

In an exemplary example, the above configuration process may be performed by a network management device. In another exemplary example, the configuration may also be implemented in an established end-to-end path through distributed signaling. In this example, the header node in the communication path may use a centralized path computing unit to complete the calculation of the end-to-end path of the communication path, and the end-to-end path includes internal transitional links of a transponder, a muxponder and a regenerator. For example, a newly defined transitional link object may be used to indicate transitional link information required by a converter/regenerator identified by an Explicit Route Object (ERO), through carrying the transitional link object in the ERO.

Figure 11:
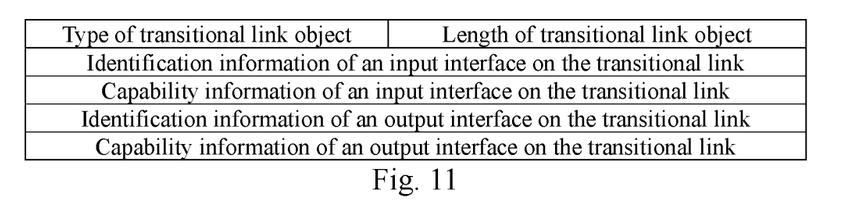
FIG. 11 is a schematic diagram of a layer structure of configuration information included in distributed signaling provided by the embodiment of the present disclosure.

In an exemplary example, as shown in FIG. 11, it is a schematic diagram of a layer structure of the configuration information included in the distributed signaling provided by the embodiment of the present disclosure. The distributed signaling may contain identification information of input and output interfaces of the transitional link, and interface capability information of the input and output interfaces. The interface capability information may contain multi-layer configuration information. For example, when the input interface is an Ethernet interface of white light, the output interface is an OTU interface of colorful light, and then the transitional link objects in the FIG. 11 are used to configure the transponder, the muxponder and the regenerator, information such as wavelengths, modulation formats and FEC formats which are used by the optical signal layer corresponding to the input and output interfaces, as well as Ethernet and OTU interfaces to be configured in the electrical signal layer, should be written into the transitional link object. Based on these pieces of information, the transponder, the muxponder and the regenerator may complete the configuration of the internal data processing module, which may specifically include the configuration of the mapping encapsulation between different technologies, and the discarding of unavailable slots, etc.

Figure 12:
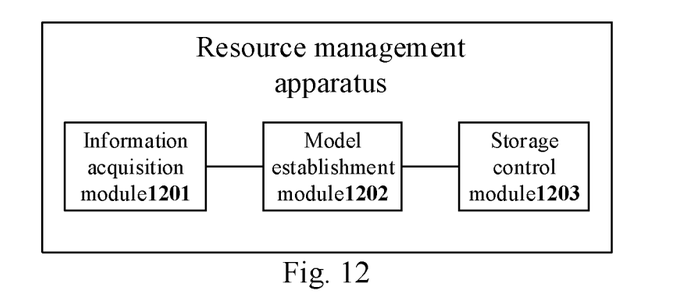
FIG. 12 is a schematic diagram of a structure of a resource management apparatus provided by the embodiment of the present disclosure.

The embodiment of the present disclosure further provides a resource management apparatus, which may be arranged in a communication device (for example, a network management device, a header node device in a communication path, etc.). As shown in FIG. 12, which is a schematic diagram of a structure of the resource management apparatus provided by the embodiment of the present disclosure, the apparatus may include: an information acquisition module 1201, a model establishment module 1202 and a storage control module 1203.

The information acquisition module 1201 may be configured to obtain node identification information and interface information of an optical network node. The interface information includes interface identification information and interface capability information of input and output interfaces of the optical network node, and a connection relationship between the input and output interfaces. For the specific acquisition process, please refer to the relevant content mentioned above, which will not be described here.

The model establishment module 1202 may be configured to establish a node resource model according to the node identification information and the interface information. Model identification information of the node resource model uniquely corresponds to the node identification information, the resource model includes at least one transitional link, and link information of the transitional link includes: interface identification information and interface capability information of an input interface and an output interface that have a connection relationship and are included respectively in an input end and an output end of the transitional link. For the specific establishment process, please refer to the relevant content mentioned above, which will not be described here.

The storage control module 1203 may be configured to store the node resource model in a resource library.

Figure 13:
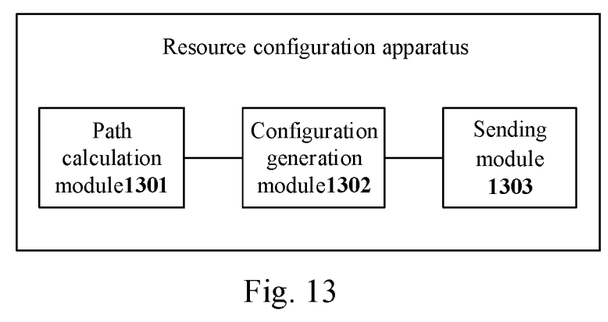
FIG. 13 is a schematic diagram of a structure of a resource configuration apparatus provided by the embodiment of the present disclosure.

The embodiment of the present disclosure further provides a resource configuration apparatus, which may be arranged in a communication device such as a network management device, a header node device in a communication path, etc. Optionally, the resource configuration apparatus may be installed in the same communication device as the resource management apparatus, or the resource configuration apparatus may be integrated in the resource management apparatus as a functional module. As shown in FIG. 13, which is a schematic diagram of a structure of the resource configuration apparatus provided by the embodiment of the present disclosure, the apparatus may include: a path calculation module 1301, a configuration generation module 1302 and a sending module 1303.

The path calculation module 1301 may be configured to perform a path calculation on a communication path including the optical network node and to be configured with a resource, and obtain a path calculation result. The path calculation may be implemented by using various computing methods that satisfy path requirements, which will not be described here.

The configuration generation module 1302 may be configured to search the node resource model corresponding to the optical network node in the resource library, and extract link information of a transitional link satisfying a demand of the path calculation result from the node resource model as node configuration information of the optical network node. The resource library may be obtained through the resource management method described above. For the specific acquisition process, please refer to the relevant content mentioned above, which will not be described here.

The sending module 1303 may be configured to send the node configuration information to the optical network node for resource configuration. For the specific process, please refer to the relevant content mentioned above, which will not be described here.

Figure 14:
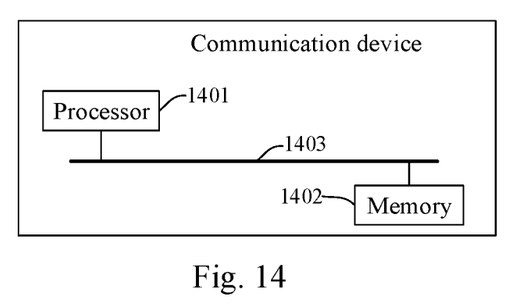
FIG. 14 is a schematic diagram of a structure of a communication device provided by the embodiment of the present disclosure.

The embodiment of the present disclosure further provides a communication device, which may be a network management device, or a node device in a network path such as the header node device. As shown in FIG. 14, which is a schematic diagram of a structure of the communication device provided by the embodiment of the present disclosure, the communication device may include: a processor 1401, a memory 1402 and a communication bus 1403.

The communication bus 1403 may be configured to enable communication connection between the processor 1401 and the memory 1402. The processor 1401 may be configured to execute a first computer program stored in the memory 1402 to implement at least one step of the resource management method provided by the embodiment of the present disclosure; and/or the processor 1401 may be configured to execute a second computer program stored in the memory 1402 to implement at least one step of the resource configuration method provided by the embodiment of the present disclosure.

The embodiment of the present disclosure further provides a computer-readable storage medium including volatile or non-volatile, removable or non-removable medium implemented in any method or technology for storage of information (such as a computer-readable instruction, a data structure, a computer program module or other data). The computer-readable storage media include, but are not limited to, RAM (Random Access Memory), ROM (Read-Only Memory), EEPROM (Electrically Erasable Programmable Read Only Memory), flash memory or other memory technology, CD-ROM (Compact disk Read-Only Memory), Digital Versatile Disks (DVD) or other optical disk storage, magnetic cassette, magnetic tape, magnetic disk storage or other magnetic storage devices, or any other medium which can be used to store desired information and which can be accessed by a computer.

According to the embodiment provided by the present disclosure, the computer-readable storage medium may be configured to store a first computer program, which may be executed by a processor to implement at least one step of the resource management method provided by the embodiment of the present disclosure; and/or the computer-readable storage medium may be configured to store a second computer program, which may be executed by a processor to implement at least one step of the resource configuration method provided by the embodiment of the present disclosure.

The embodiment of the present disclosure further provides a computer program (or referred to computer software), which may be distributed on a computer-readable medium and executed by a computing device, so as to implement at least one step of the resource management method provided by the embodiment of the present disclosure. In some cases, at least one of the steps shown or described may be performed in an order different than that described in the above embodiment.

The embodiment of the present disclosure further provides another computer program (or referred to computer software), which may be distributed on a computer-readable medium and executed by a computing device, so as to implement at least one step of the resource configuration method provided by the embodiment of the present disclosure. In some cases, at least one of the steps shown or described may be performed in an order different than that described in the above embodiment.

The embodiment of the present disclosure further provides a computer program product, which includes a computer-readable device, and the computer program described above is stored on the computer-readable device. The computer-readable device in the embodiment of the present disclosure may include the computer-readable storage medium as shown above.

It will be apparent to those having ordinary skill in the art that all or some of the steps of the methods, functional modules/units in the systems and apparatus disclosed above may be implemented as software (which may be implemented as a computer program code executable by a computing device), firmware, hardware, and suitable combinations thereof. In a hardware implementation, division between the functional modules/units mentioned in the above description does not necessarily correspond to division of physical components. For example, one physical component may have multiple functions, or one function or step may be performed by several physical components in cooperation. Some or all of the physical components may be implemented as software executed by a processor, such as a central processing unit, a digital signal processor, or a microprocessor, or as hardware, or as an integrated circuit, such as an application specific integrated circuit.

In addition, as is well known to those having ordinary skill in the art, communication medium typically embodies a computer-readable instruction, a data structure, a computer program module or other data in a modulated data signal such as a carrier wave or other transport mechanism and includes any information delivery medium. Thus, the present disclosure is not limited to any specific combination of hardware and software.

The foregoing are detailed descriptions of the embodiment of the present disclosure, taken in conjunction with the specific implements thereof, and it is not intended that the present disclosure be limited to the description. For those having ordinary skill in the technical field to which the present disclosure belongs, without departing from the invention concept of the present disclosure, several simple deductions or substitutions can be made, which should be regarded as falling within the protection scope of the present disclosure.

What is claimed is:

1. A resource management method, comprising:
obtaining node identification information and interface information of an optical network node; wherein the optical network node comprises at least one input interface and at least one output interface; and the interface information comprises interface identification information and interface capability information of any one of the at least one input interface and the at least one output interface, and a connection relationship between the at least one input interface and the at least one output interface;

establishing a node resource model according to the node identification information and the interface information; wherein model identification information of the node resource model uniquely corresponds to the node identification information, the resource model comprises at least one transitional link, and link information of any one of the at least one transitional link comprises: interface identification information and interface capability information of an input interface and an output interface that have a connection relationship and are included respectively in an input end and an output end of the transitional link; and storing the node resource model in a resource library, wherein the optical network node comprises a converter or a regenerator wherein the interface capability information comprises capability information at an optical signal layer of the interface; and the transitional link comprises an optical signal layer transitional link, and link information of the optical signal layer transitional link comprises: interface identification information and capability information at the optical signal layer of an input interface and an output interface that have a connection relationship and are included respectively in an input end and an output end of the optical signal layer transitional link.

2. The resource management method of claim 1, wherein obtaining the node identification information and the interface information of the optical network node, comprises:

sending an information acquisition request to the optical network node; and receiving an information acquisition response message sent by the optical network node, and the information acquisition response message carrying the node identification information and the interface information of the optical network node.

3. The resource management method of claim 1, wherein the capability information at the optical signal layer of the interface comprises a spectrum range supported by the interface, a modulation format supported by the interface, and/or an error correction code format supported by the interface.

4. The resource management method of claim 1, wherein the optical network node comprises a converter;

the interface capability information further comprises capability information at an electrical signal layer of the interface; and the transitional link comprises an electrical signal layer transitional link, and link information of the electrical signal layer transitional link comprises: interface identification information and capability information at the electrical signal layer of an input interface and an output interface that have a connection relationship and are included respectively in an input end and an output end of the electrical signal layer transitional link.

5. The resource management method of claim 4, wherein the capability information at the electrical signal layer of the interface comprises a signal type supported by the interface.

6. The resource management method of claim 5, wherein the information acquisition response message further carries flexible rate optical digital unit (ODUflex) information; and the link information of the electrical signal layer transitional link comprises the ODUflex information, and the ODUflex information comprises at least one of ODUflex identity information, ODUflex bandwidth information, or ODUflex occupied slot information.

7. The resource management method of claim 1, comprising:

performing a path calculation on a communication path including the optical network node and to be configured with a resource, and obtaining a path calculation result;

searching the node resource model corresponding to the optical network node in the resource library, and extracting link information of a transitional link satisfying a demand of the path calculation result from the node resource model as node configuration information of the optical network node; and sending the node configuration information to the optical network node for resource configuration.

8. A non-transitory computer-readable storage medium having a computer program stored thereon, wherein the computer program is capable of being executed by one or more processors to implement the steps of the resource management method of claim 1.

9. A communication device, comprising a processor and a memory, wherein:

the memory stores a computer program; and the processor is configured to execute the computer program to implement:

obtaining node identification information and interface information of an optical network node; wherein the optical network node comprises at least one input interface and at least one output interface; and the interface information comprises interface identification information and interface capability information of any one of the at least one input interface and the at least one output interface, and a connection relationship between the at least one input interface and the at least one output interface;

establishing a node resource model according to the node identification information and the interface information; wherein model identification information of the node resource model uniquely corresponds to the node identification information, the resource model comprises at least one transitional link, and link information of any one of the at least one transitional link comprises: interface identification information and interface capability information of an input interface and an output interface that have a connection relationship and are included respectively in an input end and an output end of the transitional link; and storing the node resource model in a resource library, wherein the optical network node comprises a converter or a regenerator, wherein the interface capability information comprises capability information at an optical signal layer of the interface; and the transitional link comprises an optical signal layer transitional link, and link information of the optical signal layer transitional link comprises: interface identification information and capability information at the optical signal layer of an input interface and an output interface that have a connection relationship and are included respectively in an input end and an output end of the optical signal layer transitional link.

10. The communication device of claim 9, wherein the processor is configured to execute the computer program to implement:
   sending an information acquisition request to the optical network node; and
   receiving an information acquisition response message sent by the optical network node, and the information acquisition response message carrying the node identification information and the interface information of the optical network node.

11. The communication device of claim 9, wherein the capability information at the optical signal layer of the interface comprises a spectrum range supported by the interface, a modulation format supported by the interface, and/or an error correction code format supported by the interface.

12. The communication device of claim 9, wherein the optical network node comprises a converter;
   the interface capability information further comprises capability information at an electrical signal layer of the interface; and
   the transitional link comprises an electrical signal layer transitional link, and link information of the electrical signal layer transitional link comprises: interface identification information and capability information at the electrical signal layer of an input interface and an output interface that have a connection relationship and are included respectively in an input end and an output end of the electrical signal layer transitional link.

13. The communication device of claim 12, wherein the capability information at the electrical signal layer of the interface comprises a signal type supported by the interface.

14. The communication device of claim 13, wherein
   the information acquisition response message further carries flexible rate optical digital unit (ODUflex) information; and
   the link information of the electrical signal layer transitional link comprises the ODUflex information, and the ODUflex information comprises at least one of ODUflex identity information, ODUflex bandwidth information, or ODUflex occupied slot information.

15. The communication device of claim 9, wherein the processor is configured to execute the computer program to implement:
   performing a path calculation on a communication path including the optical network node and to be configured with a resource, and obtaining a path calculation result;
   searching the node resource model corresponding to the optical network node in the resource library, and extracting link information of a transitional link satisfying a demand of the path calculation result from the node resource model as node configuration information of the optical network node; and
   sending the node configuration information to the optical network node for resource configuration.

* * * * *